Feb. 21, 1928.
W. H. SMYTH
HIGH SPEED TRACTOR
Filed March 28, 1922
1,660,100
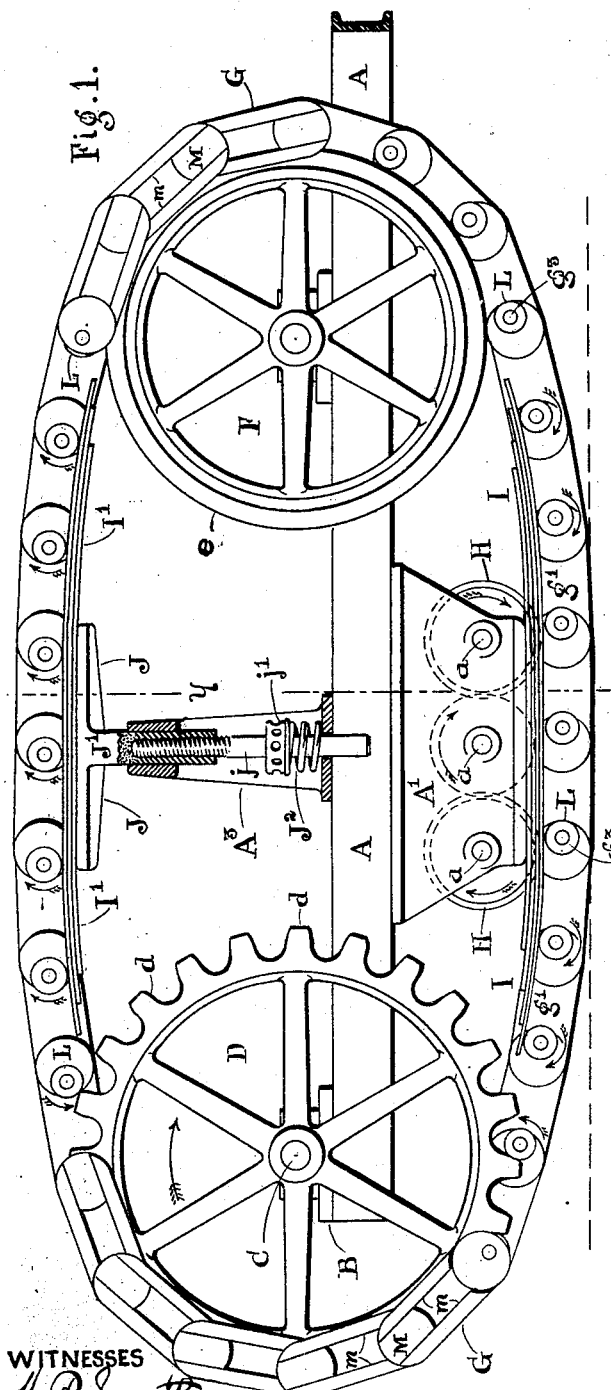
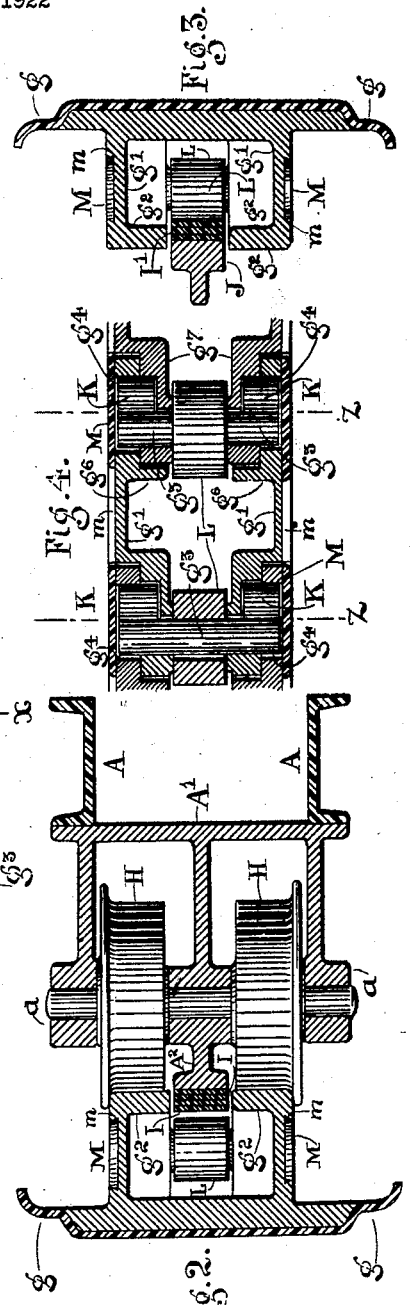
INVENTOR
William H. Smyth Patented Feb. 21, 1928.

1,660,100

UNITED STATES PATENT OFFICE.

WILLIAM H. SMYTH, OF BERKELEY, CALIFORNIA.

HIGH-SPEED TRACTOR.

Application filed March 28, 1922. Serial No. 547,420½.

My invention relates to self-laying-track vehicles. It has as its main object to provide such constructive features and arrangements in the load-bearing track assembly as will permit, in this character of device, speed of travel comparable to that of the round wheel type. And to accomplish this main purpose by means so simple and efficient as to increase the effective life and smoothness of operation, while reducing the frictional wear and losses of power, the breakage of parts, upkeep expense and initial cost of this character of vehicle.

To this general end, a more specific object of my invention is to provide a smooth, undistorted track for the load-bearing trackwheels, a track which cannot kink between the load-bearing points of wheel and track contact.

Another specific object is to provide means whereby the track-chain is automatically kept under local resilient tension at the points where, in the lower run of the chain, ground obstruction kinking occurs under present practice, and similar means to avoid the fiddle-string chain-jerking in the upper run, incident to intermittent support and general tensioning by forcible adjustment of the idler wheel as at present practiced.

A further specific object is to provide anti-friction means at points of present excessive wear and breakage where, under the constructions of practice prior to this disclosure, anti-friction means are impracticable.

A typical expression of my invention which accomplishes all these novel and highly important objects is shown in the accompanying drawing wherein:

Fig. 1 shows a side elevation; parts of the chain-track being omitted for simplicity and clearness of illustration;

Fig. 2 on a larger scale, a section on dotted line $x$ of Fig. 1;

Fig. 3 a corresponding section on dotted line $y$;

Fig. 4 a horizontal section of a short length of track-chain.

The arrows in Fig. 1 indicate direction of motion.

The track-chain assembly alone distinguishes the self-laying-track type from the "round-wheeler" form of vehicle. The common power element and its supporting frame-work being substantially unaffected as to construction, by my invention, and their construction being within the common knowledge of mechanics skilled in this art, I have hereinafter confined my description to those parts directly affected by my invention, for simplicity in the drawing, with enhanced clarity in the specification. But, in what follows, it is to be understood, in the drawing, description, and claims, that the sprocketed power-wheel with its shaft, journal-box, and indicated frame, as designated and illustrated, are intended to represent, not alone a power-wheel but the motor element complete with any suitable frame mounting or connection between the power element and the track-chain assembly.

With this understanding, A represents the frame-work pertaining to a self-laying-track motor vehicle. It carries journal box B, shaft C, power-wheel D with its circumferential teeth or sprockets $d$, and idler F with its raised centrally disposed circumferential flange $e$.

Encircling the wheel D and idler F is the, preferably double-rail, endless track-chain G composed of links $g^1$, which chain will later be particularized.

H—H, are load-bearing track-wheels travelling upon the rails of the track chain; they are suitably journalled at $a$ in a portion of the frame-work shown as a depending bracket $A^1$ secured to A. The bracket $A^1$ and wheels H—H, journalled therein, are shown in Fig. 1, and in Fig. 2, the wheels H—H are shown travelling upon and being supported by the double rails of the chain.

$A^1$ is provided with a rib or the like $A^2$ extending downward into the space between the chain-track rails. To $A^2$ is secured a resilient local control and chain guide, shown as a leaf-spring I, between the rails. The spring-guide I extends fore-and-aft to within a short distance respectively, of the peripheries of sprocket-wheel D and idler F, constituting a lower resiliently flexible chain-track for the ground-run of chain G, and also an effective trash-excluding cover for the functioning interior parts of the endless chain during its ground contact. The leaves of spring I are normally straight, or only very slightly curved, but when in position, as shown, they exert local tension upon and furnish lateral guidance to the chain.

A³ is a part of the framework suitably located, as shown in Fig. 1 to sustain a, preferably resiliently adjustable, T-headed tension bar J. For the adjustability of J, is shown the rod $j$ which is threaded into the shank J¹ of the T-bar, and it is provided with a radially perforated or socketed boss $j^1$ resting upon a stiff coil tension spring J² encircling $j$ and abutting upon the base of A³. Secured upon the T-head of tension bar J another spring-guide is mounted, in many respects similar to I, but supporting and tensioning the upper run of the endless-chain-track, thus I¹ constitutes, with its adjustable support J, a general as well as a local automatic tension, upper flexible chain-track.

The endless track-chain G consists of ground contact tread-shoes $g$—$g$ of suitable dimensions, not shown in Fig. 1, but clearly shown in Figs. 2 and 3. Secured to the upper surface of each shoe $g$ are two links $g^1$—$g^1$ constituting adjacent track sections with extended rail-heads $g^2$—$g^2$ having parallel inner and outer edges. Other than being (when made, as shown), "right-and-left," the links $g^1$—$g^1$ are substantially similar in construction, and each is provided with hinge connections to unite them and successive links into the flexible endless chain G. An element of each hinge connection is a loose rollable pin $g^3$ extending transversely across from link to link.

An anti-friction bearing, shown as a short roller K is in contact with each hinge-pin $g^3$ approximately of the same diameter so they roll upon each other adjacent to the hinge center of motion—the dotted line $z$ Fig. 4. The anti-friction rollers are enclosed in a dirt-excluding shell $g^4$ made up of the overlapping co-acting ends $g^6$ and $g^7$ of succeeding links, as shown in Fig. 4.

An additional anti-friction provision is a roller L loosely journalled upon the pin $g^3$ in the space between the adjacent parallel link rail-heads $g^2$—$g^2$. These rollers L—L are of such diameter that they do not contact with the guide-member I when they are travelling upon smooth ground and they are passing beneath the load-bearing track-wheels H—H, but are sufficiently close to prevent upward kinking of the chain at its hinges between the load-bearing points of track-wheel and track contact. The rollers L—L also serve the additional function of anti-friction sprocket-abutments, co-acting anti-frictionally with the sprockets $d$—$d$ of the power-wheel D, and rolling when occasion requires upon the raised central flange $e$ of idler E regardless of the idler's direction of rotation.

The outer side of each shell-enclosure $g^4$ has an aperture adapted to permit the easy inspection or renewal of the pins $g^3$—$g^3$ and also the rollers K—K. This renewal aperture is provided with a closure, shown as a slidable bevelled edged plate M seated in a bevelled edged groove $m$ and flush with the outer surface of the link, as shown in Figs. 2, 3 and 4. The plate M is preferably made a loose fit for its groove and then slightly bent to give it a rather tight torsional fit when in place.

In operation the load-bearing track-wheels normally bear the entire weight of the machine with its motor element etc. When encountering a ground obstruction the track-chain G gives with a resiliently controlled curving flexure, without the strain of suddenly destructive kinking, as the anti-friction rollers L—L roll smoothly upon the local tension spring guides I and the spring returns the chain in like progressive manner to its normal path without jerk or jolt when the obstruction is being passed. This local resilient automatic control is effective both in front and at the rear, that is to say when the tractor is meeting and when leaving an obstruction. And when an extraordinary obstruction is encountered the chain is free to correspondingly respond by the upper fold compressing the coil spring J². In this case the rollers L facilitate the forward movement of and retreat to normal position of the chain by rolling upon the flange $e$ regardless of the direction of rotation of the idler wheel E.

Due to the weight of the track-chain and other causes, the upper fold is exceedingly apt to leave its bearing wheel with a sudden flopping, carpet-shaking jerky motion which grows to a practically prohibitive degree as speed is increased, under present general practice and construction. But by the local automatic tensioning provisions of the present invention, these highly deleterious effects are avoided. The spring-guides I¹—I¹ receive and cushion the track-chain immediately, before flop or jerk can be generated. And, by the co-action of the anti-friction rollers L—L and the instantly responsive spring-guide supporting-track, the track-chain G runs smoothly from sprocket-wheel D to idler E and from idler to sprocket wheel practically regardless of speed.

By practical experience it has frequently been demonstrated that comparatively large and massive load-bearing-wheels H—H are necessary: small chain-carried rollers while in many ways advantageous as anti-friction means alone, have proved impractical as load-bearing track-wheels for general tractor service, under the conditions to be met and surmounted by the ground run of self-laying track-chain. The destructive uncushioned pounding, the high rotational speed due to small diameter and ground conditions make their serviceable life and that of their co-acting parts impractically short, and nega-tive even their anti-friction function under the usually expected conditions of tractor use at even present comparatively slow nor-mal speeds. Under these conditions the weight-bearing function is paramount, the anti-friction function while desirable, can be and is most commonly dispensed with at con-siderable cost of power. As speed increases, however, the anti-friction function grows still more rapidly in value, till soon its de-mands become an imperative limitation to speed under common present practice and construction.

These conflicting and hitherto incompati-ble functional requirements, are harmonized and made practically available by the load-bearing track-wheels H—H, and the non-load-bearing rollers L—L with their co-act-ing elements and provisions of the present invention. By this inventive division and appropriate distribution of function herein described, anti-friction rollers are restrict-ed to anti-friction functions for which they are inherently adapted; and to the massive load-bearing track-wheels are apportioned the heavy duty of resisting the pounding un-der load-carrying service, for which func-tion they are inherently fitted; with the re-sult that, owing to the present invention, greatly increased speed is no longer inhibit-ed by the functional conflict that practically bars it under existing common practice and construction.

The rails of self-laying-track vehicles be-ing composed of a multitude of hinged sec-tions the multitudinous joints are fruitful sources of much frictional power losses, great upkeep expense, and comparatively slow speed is made practically compulsory. By the simple and inexpensive anti-friction roller K of the present invention with its co-acting easy inspection provision, the ready and practically costless renewal provision, friction losses are reduced to a seemingly irreducible minimum; and the main object of high speed is thereby practically attain-able.

In view of these radical and pioneer de-partures from present accepted practice, I do not desire to be limited to the particular expressions of my invention used herein for illustrative purposes, nor limited in any way other than as in the light of my disclosure and the rightful import of the claims which follow.

I claim:

1. A tractor comprising framework, an endless track-chain its lower run adapted to ground support, track-wheels travelable upon the ground run of the chain to support the framework, antifriction rollers journalled on the chain below its track-surface, and a ground-run chain-control track coacting with the rollers to limit the vertical movement and kinking of the chain.

2. A tractor comprising framework, an endless track-chain its lower run adapted to ground support, track-wheels travelable upon the ground run of the chain to sup-port the framework, antifriction rollers journalled upon the chain below its track-surface, and resilient means coacting with the rollers to control the upward flexure of the chain.

3. A tractor comprising framework, an endless track-chain its lower run adapted to ground support, track-wheels travelable upon the ground run of the chain to sup-port the framework, antifriction rollers jour-nalled on the chain below its track-surface, and a track coacting with the rollers to sup-port the upper run of the chain.

4. A tractor comprising framework, an endless track-chain its lower run adapted to ground support, track-wheels travelable upon the ground run of the chain to sup-port the framework, antifriction rollers jour-nalled on the chain below its track-surface, and an adjustable track coacting with the rollers to support the upper run of the chain.

5. A tractor comprising framework, an endless track-chain its lower run adapted to ground support, track-wheels travelable upon the ground run of the chain to support the framework, antifriction rollers jour-nalled on the chain below its track-surface, and a resiliently adjustable track coacting with the rollers to support the upper run of the chain.

6. In a tractor comprising a frame with an endless-chain of hinged shoes adapted to ground support provided with twin-track rails raised above the inner surface of the shoes and twin track-wheels travelable upon the ground run of the rails, flexibly resili-ent means coacting with the twin track-rails adapted to guide the ground run of the endless-chain track and control its flexure.

7. In a tractor comprising a frame with an endless-chain of hinged shoes adapted to ground support provided with twin-track rails raised above the inner surface of the shoes and twin track-wheels travelable upon the ground run of the rails, flexibly resilient means depending below the track surface of the rails adapted to guide the ground run of the endless-chain and control its flexure.

8. In a tractor comprising a frame with an endless-chain of hinged tread-shoes adapted to ground support provided with twin-track rails raised above the inner sur-face of the shoes and load-bearing wheels journalled on the frame travelable upon the ground run of track rails, a flexibly resilient support guide-rail for the upper run of the endless-chain between the twin tracks upon the upper surface of which rail the chain travels.

9. In a tractor comprising a frame with an endless-chain of hinged tread-shoes adapted to ground support and provided with twin-tracks raised above the inner surface of the shoes and load-bearing wheels journalled in the frame travelable upon the ground run of the chain, an adjustable resilient support guide-rail for the upper run of the endless-chain between the twin-tracks upon the upper surface of which rail the chain travels.

WILLIAM H. SMYTH.